United States Patent
Brown et al.

(10) Patent No.: US 11,057,415 B1
(45) Date of Patent: Jul. 6, 2021

(54) SYSTEMS AND METHODS FOR DYNAMIC ZONE PROTECTION OF NETWORKS

(71) Applicant: LookingGlass Cyber Solutions, Inc., Reston, VA (US)

(72) Inventors: Bryan Wesley Brown, Baltimore, MD (US); Paolo Fabio Zaino, Brighton (GB); Allan Thomson, Pleasanton, CA (US)

(73) Assignee: LOOKINGGLASS CYBER SOLUTIONS, INC., Reston, VA (US)

( * ) Notice: Subject to any disclaimer, the term of this patent is extended or adjusted under 35 U.S.C. 154(b) by 0 days.

(21) Appl. No.: 17/171,442

(22) Filed: Feb. 9, 2021

(51) Int. Cl.
*H04L 29/06* (2006.01)
*H04L 12/24* (2006.01)

(52) U.S. Cl.
CPC ........ *H04L 63/1425* (2013.01); *H04L 41/046* (2013.01); *H04L 41/14* (2013.01); *H04L 63/0236* (2013.01); *H04L 69/22* (2013.01)

(58) Field of Classification Search
CPC .................................................. H04L 63/1425
USPC .......................................................... 726/13
See application file for complete search history.

(56) References Cited

U.S. PATENT DOCUMENTS

| | | | | |
|---|---|---|---|---|
| 6,031,573 A * | 2/2000 | MacCormack | .. | G08B 13/19604 375/240.16 |
| 7,292,531 B1 * | 11/2007 | Hill | ..................... | H04L 41/0896 370/230.1 |
| 7,296,288 B1 * | 11/2007 | Hill | ..................... | H04L 41/0896 713/194 |
| 7,634,529 B2 * | 12/2009 | Ellis, III | ............... | G06F 9/5072 709/201 |
| 8,111,629 B2 * | 2/2012 | Oron | ..................... | H04L 47/828 370/252 |
| 10,362,062 B1 * | 7/2019 | Dash | ................... | H04L 63/1408 |
| 2005/0125195 A1 * | 6/2005 | Brendel | .............. | H04L 63/1408 702/182 |
| 2008/0019505 A1 * | 1/2008 | Thomas | .............. | H04L 63/0428 380/28 |
| 2010/0031323 A1 * | 2/2010 | Wiryaman | .............. | H04L 63/20 726/4 |
| 2012/0029002 A1 * | 2/2012 | Straub | .................. | A61K 31/506 514/275 |
| 2013/0064096 A1 * | 3/2013 | Degioanni | ............ | H04L 43/026 370/241 |
| 2015/0052575 A1 * | 2/2015 | Myla | ..................... | H04L 67/146 726/1 |
| 2017/0168751 A1 * | 6/2017 | Stevens | ............. | G06F 16/24568 |
| 2017/0279829 A1 * | 9/2017 | Vasseur | ............... | H04L 63/1425 |

(Continued)

OTHER PUBLICATIONS

Microsoft Computer Dictionary, "parallel", "parallel processing", 5th edition, pp. 389-390, 2002 (Year: 2002).*

*Primary Examiner* — Ondrej C Vostal

(74) *Attorney, Agent, or Firm* — Bookoff McAndrews, PLLC

(57) ABSTRACT

Disclosed are systems and methods for securing a network using one or more controllers and one or more network nodes. A method may utilize a packet processing engine configured to process incoming network packets, a processing analysis engine configured to perform relatively more complex processing and analysis, and one or more controllers configured to coordinate one or more packet processing engines and one or more processing analysis engines across a network to perform endpoint threat detection and mitigation.

20 Claims, 10 Drawing Sheets

(56) References Cited

U.S. PATENT DOCUMENTS

2018/0191515 A1* 7/2018 Vivekanandan .... H04L 12/4641
2020/0287996 A1* 9/2020 Vann ................... H04L 12/4633

* cited by examiner

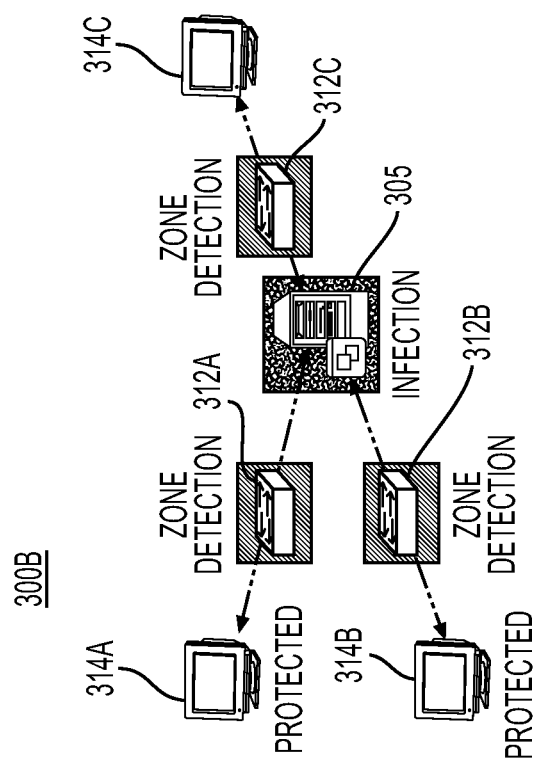
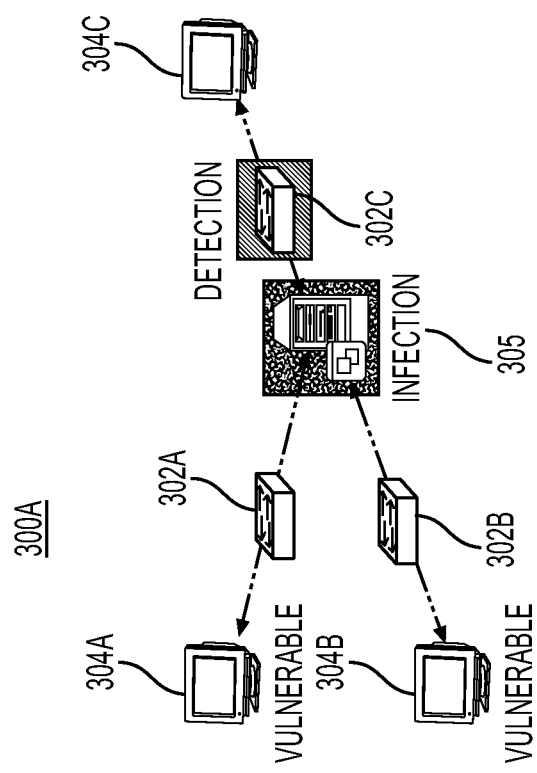
FIG. 3B
FIG. 3A

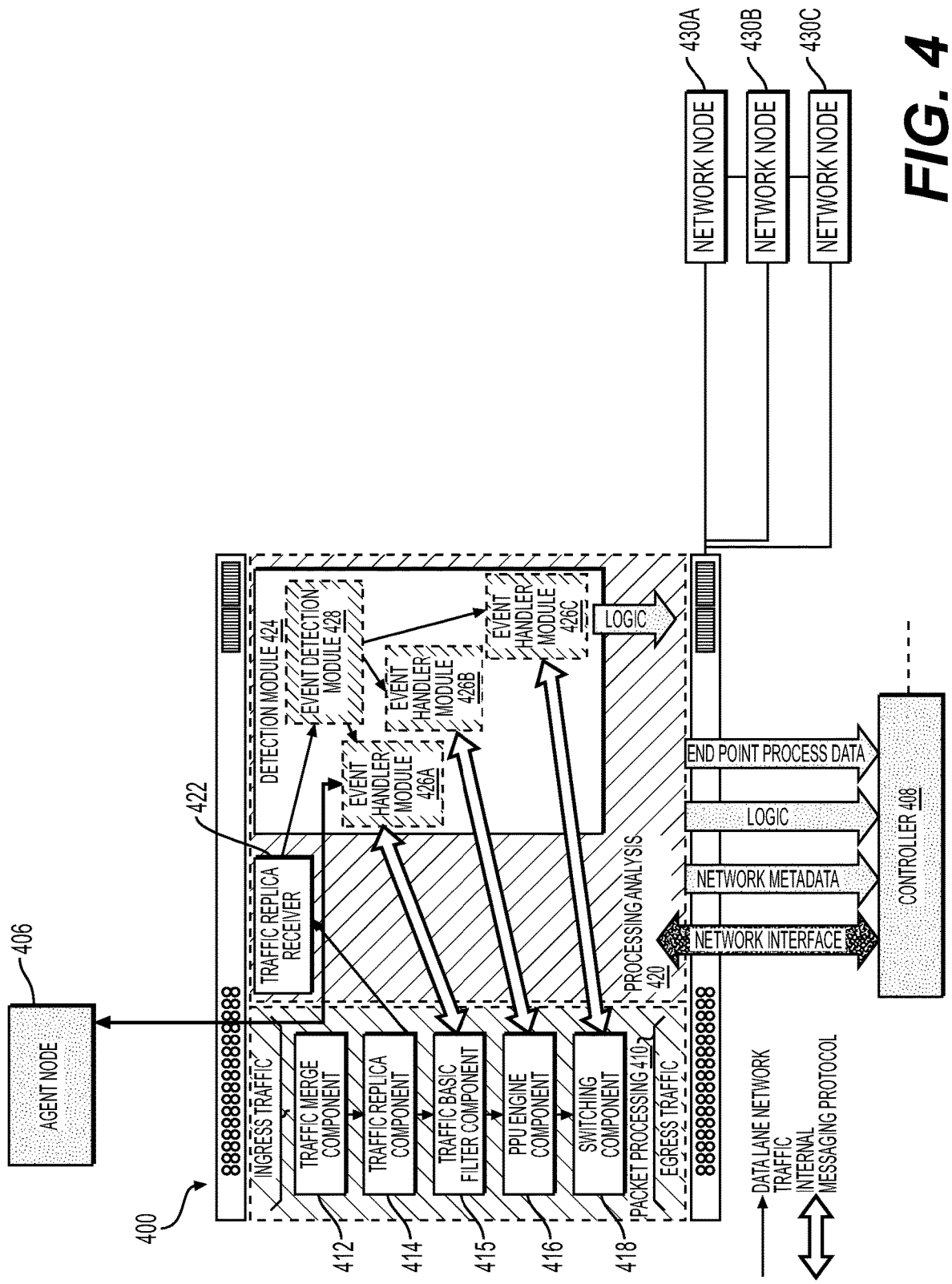

SYSTEMS AND METHODS FOR DYNAMIC ZONE PROTECTION OF NETWORKS

DETAILED DESCRIPTION

Technical Field

The present disclosure relates to systems and methods of securing a network and, more particularly, to systems and methods of dynamic zone protection of networks.

BACKGROUND

Some methods and systems of securing a network are mostly based on hardware. One of the fundamental problems with hardware-based security is that it lacks the ability to perform computationally complex and intensive processing for threat detection, for example, where multiple sources have to be correlated before deciding that a data flow contains a threat, in addition to performing threat mitigation based on such detections. Moreover, conventional methods and systems typically provide limited options to dynamically program and update. Due to the use of high data rates (e.g., 100 gbps), it has become insufficient to utilize conventional methods and systems by simply applying more computing resources to threat detection/mitigation without considering how those computing resources may be used in an efficient and effective manner while keeping up with the high throughput demands of higher scale network traffic.

Therefore, there is a need for systems and methods for creating relatively more complex and computation intensive processing that may leverage available hardware capabilities by incorporating horizontal and vertical scaling approaches to the use of such hardware. That is, there is a need to achieve more efficient and effective threat detection and mitigation without relying on specific hardware performance.

SUMMARY OF THE DISCLOSURE

Embodiments of the present disclosure include systems and methods for dynamic zone protection.

According to certain embodiments, a computer-implemented method of securing a network using one or more controllers and one or more network nodes is disclosed. The computer-implemented method may include: receiving data packets at a packet processing engine of a first network node of the network; forwarding, by the packet processing engine, the received data packets to one or more processing analysis engines of the first network node; retrieving, by the packet processing engine, one or more attributes associated with one or more predetermined data packets of interest; identifying and comparing, by the packet processing engine, one or more attributes of the received data packets to the one or more attributes associated with the one or more predetermined data packets of interest; processing, by the packet processing engine, the received data packets, a session associated with the received data packets, and/or a data flow associated with the received data packets based at least in part on the comparison; analyzing, by at least one processing analysis engine, the forwarded data packets, a session associated with the forwarded data packets, and/or a data flow associated with the forwarded data packets in parallel with the identifying and comparing step performed by the packet processing engine; and transmitting, by the at least one processing analysis engine, the analysis of the forwarded data packets, associated session, and/or associated data flow to the one or more controllers and/or one or more additional network nodes of the network; wherein the one or more controllers are configured to control the first network node to (i) update the one or more predetermined data packets of interests based on the received analysis and (ii) transmit one or more attributes associated with the updated one or more predetermined data packets of interest to the one or more additional network nodes and/or one or more agent nodes.

In accordance with another embodiment, a system for securing a network is disclosed. The system may include: a first network node comprising a first packet processing engine and one or more processing analysis engines including a first processing analysis engine; and one or more controllers configured to control at least the first network node. The first packet processing engine may be to: receive and forward data packets to the first processing analysis engine, retrieve one or more attributes associated with one or more predetermined data packets of interest, identify and compare one or more attributes of the received data packets to the one or more attributes associated with the one or more predetermined data packets of interest, and process the received data packets, a session associated with the received data packets, and/or a data flow associated with the received data packets based at least in part on the comparison. The first processing analysis engine may be configured to: analyze the forwarded data packets, a session associated with the forwarded data packets, and/or a data flow associated with the forwarded data packets in parallel with the identifying and comparing step performed by the first packet processing engine, and transmit the analysis of the forwarded data packets, associated session, and/or associated data flow to one or more controllers and/or one or more additional network nodes of the network. The one or more controllers may be configured to control at least the first network node to: (i) update the one or more predetermined data packets of interests based on the received analysis and (ii) transmit one or more attributes associated with the updated one or more predetermined data packets of interest to the one or more additional network nodes.

In accordance with another embodiment, a system for securing a network is disclosed. The system may include: an agent node; a first network node comprising a first packet processing engine and one or more processing analysis engines including a first processing analysis engine; and one or more controllers. The agent node may be configured to transmit one or more messages regarding a network connected device to a first processing analysis engine of a first network node and/or one or more controllers, wherein the network connected device is connected to the first network node of the network. In some embodiments, the first packet processing engine may be configured to: receive and forward a plurality of data packets to the first processing analysis engine, retrieve one or more attributes associated with one or more predetermined data packets of interest, identify and compare one or more attributes of the received data packets to the one or more attributes associated with the one or more predetermined data packets of interest, and process the received data packets, a session associated with the received data packets, and/or a data flow associated with the received data packets based at least in part on the comparison. The first processing analysis engine may be configured to: analyze the forwarded data packet, a session associated with the forwarded data packets, and/or a data flow associated with the forwarded data packets at least based on the received one or more messages regarding the network connected device in parallel with the identifying and comparing step performed by the first packet processing engine, and transmit the analysis and/or the one or more messages regarding the network connected device to the one or more controllers. The one or more controller may be configured to control at least the first network node to: (i) update the one or more predetermined data packets of interests based on the received analysis and the one or more messages regarding the network connected device and (ii) transmit one or more attributes associated with the updated one or more predetermined data packets of interest to the one or more network nodes.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3A depicts a security system lacking dynamic zone protection.

FIG. 3B depicts an exemplary security system implementing dynamic zone protection, according to embodiments of the present disclosure.

FIG. 4 depicts an exemplary network node according to embodiments of the present disclosure.

DETAILED DESCRIPTION OF EMBODIMENTS

Figure 1:
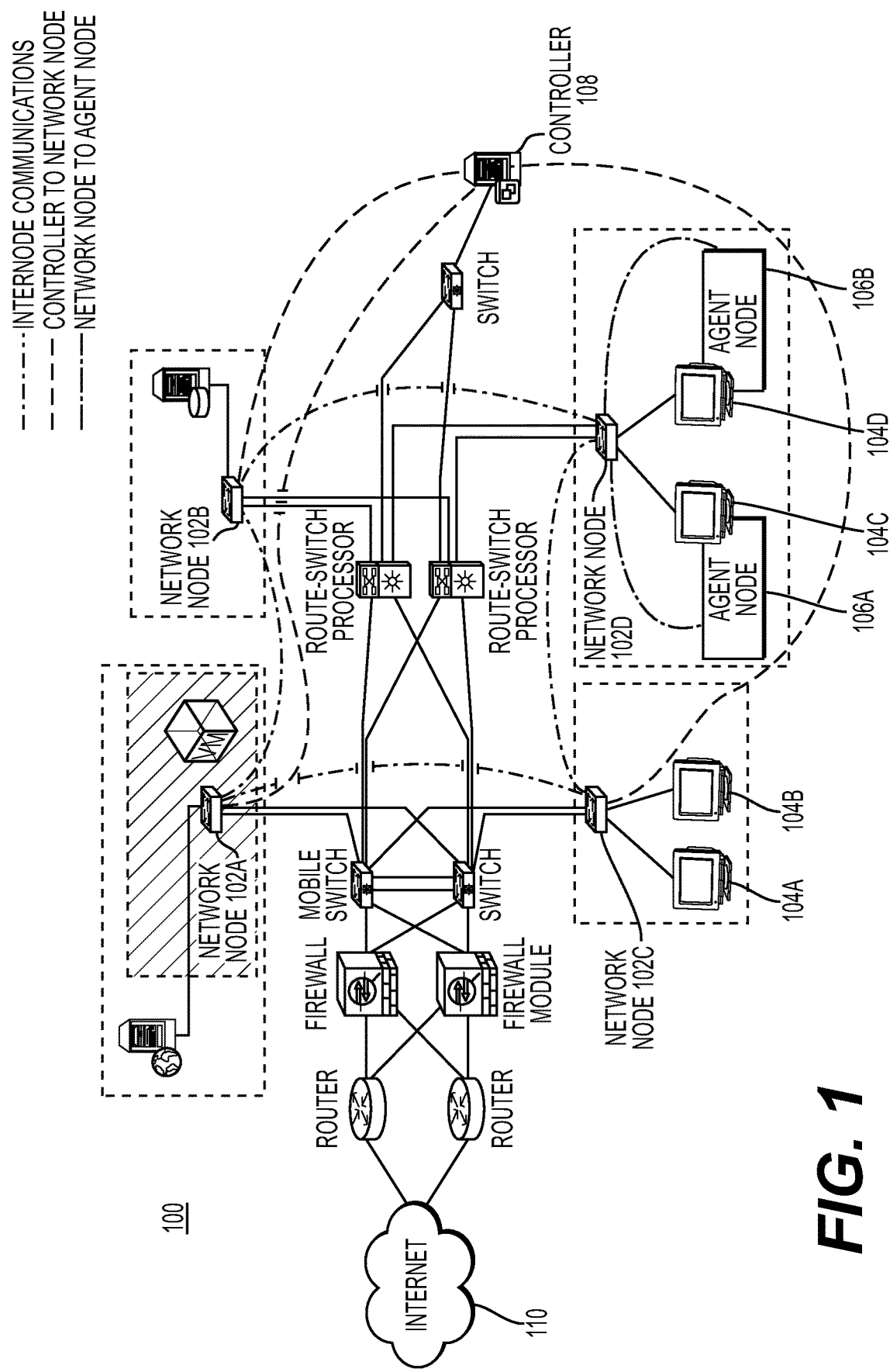
FIG. 1 depicts a schematic diagram illustrating an example of a computer network and environment within which the computer systems and methods disclosed herein are implemented according to some embodiments of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

One of the challenges associated with providing threat protection across an organization is providing threat protection that scales across the organization (e.g., across multiple networks, multiple users, multiple sites, multiple zones, as will be described in further detail below) at data line rates once a threat is detected at a single point within the organization environment. The embodiments disclosed herein are directed to specialized software architecture and design that provide a combination of the high throughput detection and sophisticated processing required to handle deeper correlation/analysis of cyber threats across a large-scale organization environment. In the context of the current disclosure, an organization environment may include any networked environment associated with a business, enterprise, and/or organization.

In the context of the current disclosure, dynamic zone protection refers to a method and system for securing a network using one or more controllers, one or more network nodes, and/or one or more agent nodes in accordance to the embodiments disclosed herein. In some embodiments, dynamic zone protection may include the following components as will be described in further detail below: a packet processing engine configured to process incoming network packets, a processing analysis engine configured to perform relatively more complex processing and analysis, endpoint threat detection and mitigation that may be performed utilizing the packet processing engine and the processing analysis engine, and one or more controllers configured to coordinate one or more packet processing engines and one or more processing analysis engines across a network. That is, the aforementioned components may be utilized to provide security for various network-connected devices within a network as part of a dynamic zone protection scheme. For example, the overall tasks associated with threat detection and mitigation may be distributed amongst and across the components, as will be described in further detail below; however, it should appreciated that any of the components may be combined with each other into combined devices, or separated into separate devices, whether physical, remote, virtual, or otherwise, as desired. In the context of the current disclosure, a network connected device may therefore refer to any physical device connected to a network whether local or remote, as well as any virtual devices and/or virtual services (e.g., micro-services) running on such devices included in the network or remote from the network. For example, a network connected device may include any computing device, e.g., server, a mobile device, a desktop computer, a payment terminal with a computer chip, etc. or any other device or service in communication with the network.

Accordingly, the embodiments disclosed herein may provide a threat detection and mitigation capability that provides dynamically driven protection across a network and system, for example, of an enterprise. In some embodiments, the network and system may be located on site and/or in the cloud, or any combination of local and cloud locations of the network.

Some advantages provided by the embodiments disclosed herein may include: (1) the ability to perform higher speed threat detection and mitigation across multiple network locations simultaneously; (2) coordinated action across network and endpoint providing unified protection of network without requiring human action or significant systems delay; and (3) ability to scale such unified protection in an environment where networks and endpoints have different speeds and compute capability, thereby allowing protection to dynamically apply to both lower and higher speed environments with the same detection and mitigation logic.

Turning now to the figures, FIG. 1 shows a block diagram of a computer network and environment (hereinafter referred to as system 100) for implementing embodiments of the present disclosure, or aspects thereof. System 100 may include one or more network nodes 102A-102D, one or more endpoints 104A-104D, one or more agent nodes 106A-

106B, and one or more controllers 108. As shown in FIG. 1, one or more switches, firewall modules, routers, and/or router-switch processors may interconnect the aforementioned network nodes 102A-102D, endpoints 104A-104D, agent nodes 106A-106B, and/or controllers 108. The network nodes 102A-102D, endpoints 104A-104D, agent nodes 106A-106B, and/or controllers 108 may be connected to the internet 110 through the one or more switches, firewall modules, routers, and/or router-switch processors. It is understood that the system 100 may include less than or more than the number of network nodes, endpoints, agent nodes, and/or controllers depicted in the FIG. 1 in other embodiments.

The one or more network nodes 102A-102D may form a distributed control plane. The controller 108 may be configured to manage the distributed control plane. In some embodiments, the controller 108 may manage the distributed control plane by alerting, automating, and/or implementing workflow integrations for the network nodes 102A-102D. Accordingly, the controller 108 may be referred to as a policy decision point for the system 100. For example, policies such as automation and/or workflow integrations for the one or more network nodes 102A-102D may be determined by the controller 108. In some embodiments, any combination of the one or more network nodes 102A-102D may comprise the controller 108.

The one or more network nodes 102A-102D may be configured to provide visibility to a network associated with each respective network node 102A-102D and enforce predetermined policies, e.g., automation and/or workflow integrations. For example, network nodes 102A-102D may provide connection reports, e.g., to the controller 108, to provide such visibility. In some embodiments, the controller 108 may update policies for the one or more network nodes 102A-102D based on such reports. Network nodes 102A-102D may be deployed in a transparent or a non-transparent mode, as shown below and described with reference to FIGS. 7A-7B.

In some embodiments, a network node 102A may provide access to a perimeter network including DMZ services, such as, web servers, mail servers, FTP servers, VoIP servers, and the like. In such embodiments, network node 102A may provide visibility to the perimeter network and enforce predetermined polices for the perimeter network. In some embodiments, a network node 102B, 102D may provide access to an internal network Local Area Network (LAN), such as a database workgroup, user workgroup, port, VLAN, application, network services, and the like. In such embodiments, network node 102B, 102D may provide visibility to the internal LAN and enforce predetermined policies for the internal network LAN. For example, network node 102B, 102D may transmit information including processes, users, and/or files associated with each respective network. In some embodiments, a network node 102C may be associated with (e.g., provide access to) cloud networks such as an object storage service (e.g., S3 bucket). In such embodiments, network node 102C may provide visibility to the cloud network and enforce predetermined policies for the cloud network.

In some embodiments, a network node 102D may communicate with one or more agent nodes 106A-106B associated with one or more endpoints 104C-104D. The one or more endpoints 104C-104D may include one or more network connected devices according to some embodiments. The network node 102D may obtain information regarding the one or more endpoints 104C-104D via the one or more agent nodes 106A-106B, as will be described in further detail below.

Agent nodes 106A-106B may provide visibility regarding each associated endpoint 104C-104D and may also enforce predetermined policies for the endpoints 104C-104D. In some embodiments, an agent node 106A-106B may comprise a browser plugin, a process memory-dumper, plugin framework, etc. For example, a browser plugin may be configured to detect malicious URLs inside encrypted connections. As another example, a process memory-dumper may be configured to inspect and capture in-memory and running processes. The process memory-dumper may be further configured to automate connection to a controller 108 for disassembly and forensic analysis. As yet another example, plugin framework may provide extensions for additional host-based detection, deception and mitigation capabilities via SQL query (e.g., OSQuery).

Agent nodes 106A-106B may be configured to query any software, e.g., installed on an endpoint 104C-104D, without requiring the software to be running. In some embodiments, agent nodes 106A-106B may detect vulnerable software across an organization, e.g., system 100, thereby providing useful information for asset inventory and compliance. For example, the agent nodes 106A-106B may query for and determine vulnerable versions of a web browser. In some embodiments, agent nodes 106A-106B may be configured to query any active processes and related connections. For example, the agent nodes 106A-106B may query for a specific open port. As another example, the agent nodes 106A-106B may query for any open remote ports. The agent nodes 106A-106B may be configured to query active users and associated processes and connections. For example, the agent nodes 106A-106B may query user executed specific process and retrieve the process path. As another example, the agent nodes 106A-106B may query file-less processes with remote connections. In some embodiments, the agent nodes 106A-106B may perform queries on any connected devices.

Figure 2:
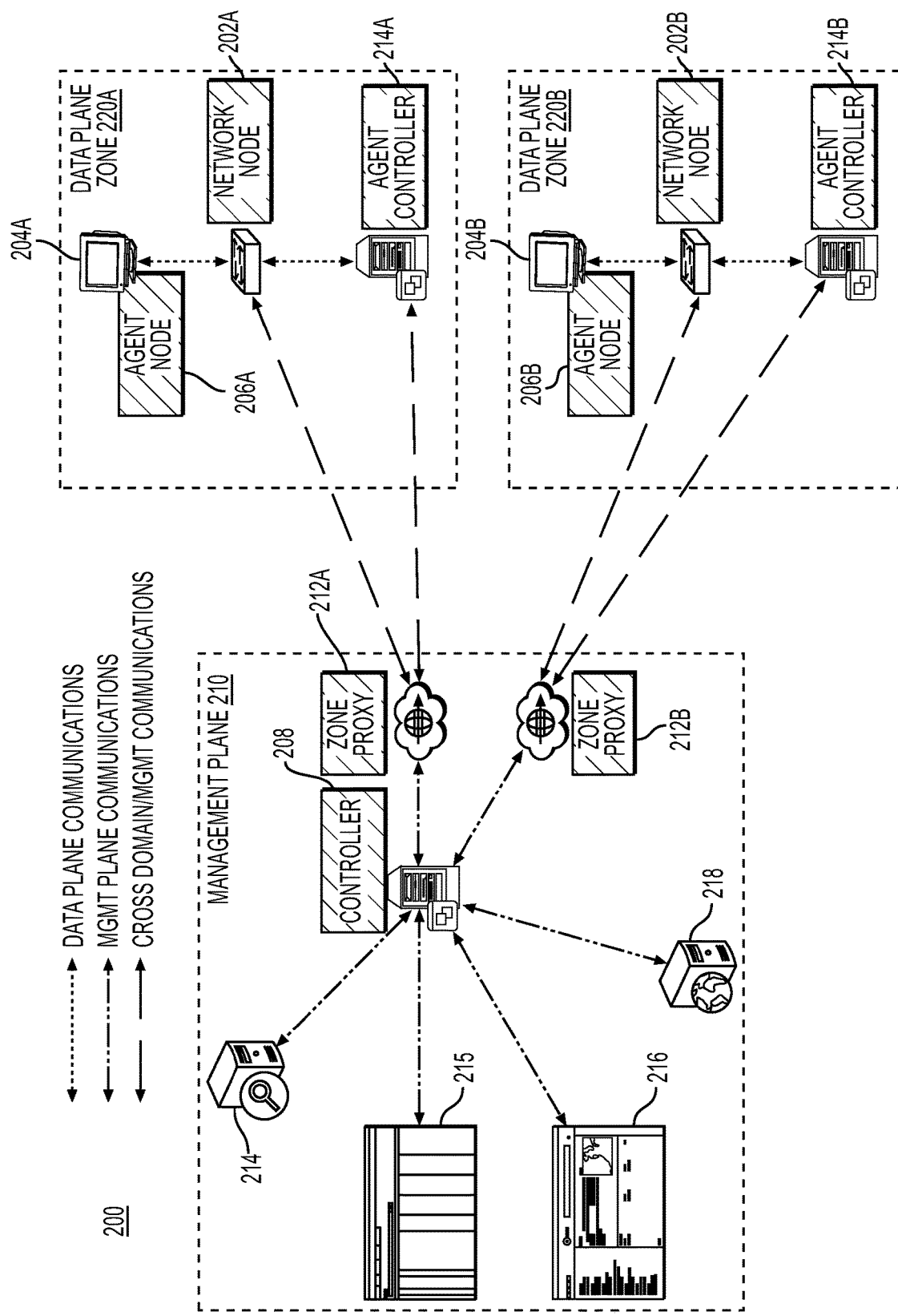
FIG. 2 depicts a schematic diagram illustrating an example of a computer network and environment within which the computer systems and methods disclosed herein are implemented according to some embodiments of the present disclosure.

FIG. 2 shows a block diagram of a computer network and environment (hereinafter referred to as system 200) for implementing embodiments of the present disclosure, or aspects thereof. As shown in FIG. 2, the system 200 may comprise a management plane 210 including a controller 208, a first zone proxy 212A, a second zone proxy 212B, security information and event management system (SIEM) 214, security operations workflow management system 215, intelligence scoring system 216, and openflow controller 218. SIEM 214 may be configured to aggregate and/or view security logs and alerts. Security operations workflow management system 215 may be configured to coordinate threat mitigation based on certain triggers, e.g., such as certain detected threats, and invoke changes in the system 200 to mitigate the threat and/or reflect the coordinated threat mitigation. Intelligence scoring system 216 may be configured to aggregate information associated with identified and/or potential threats, e.g., information provided by external systems and/or information based on threats detected and mitigated by the system 200, and determine scores for threats relevant to system 200. In some embodiments, an openflow controller 218 may be configured to use the OpenFlow protocol to connect and configured network devices, e.g., one or more switches, firewall modules, routers, and/or router-switch processors as depicted in FIG. 1, to determine optimal paths for network traffic. It is understood that the openflow controller 218 may be any appropriate software-defined network (SDN) controller in some embodiments. System 200 may further comprise one or more data plane zones 220A-220B. As shown in FIG. 2, each data plane zone 220A-220B may include a network node 202A-202B, an endpoint 204A-204B, an agent node 206A-206B, and an agent controller 214A-214B. An agent controller 214A-214B may be configured to communicate with a zone proxy 212A-212B and manage one or more associated agent node 206A-206B, as will be described in further detail below.

The controller 108 may manage each data plane zone 220A-220B via a dedicated proxy 212A-212B as shown in FIG. 2. It is understood that there may be less than or more than two data plane zones in other embodiments. Cross domain communications, e.g., communications between the management plane 210 and the data plane zones 220A-220B, may be performed via the proxy 212A-212B and each dedicated data plane zone 220A-220B, e.g., network node 202A-202B and/or agent controller 214A-214B. Accordingly, zone-specific actions may be defined by the management plane 210 and dynamically managed throughout the system 200, as will be described in further detail below.

In some embodiments, management plane 210 communications may include policy, intelligence, distribution, and/or monitoring and/or statistics. For example, the controller 208 may transmit information including logging, events, and/or alerts to the SIEM 214. As another example, the controller 208 may perform workflow orchestration based on the security operations workflow system 215. As another example, the controller 208 may obtain threat scores from the intelligence scoring system 216. As yet another example, the controller 208 may communicate with the openflow controller 218 to determine optimal paths for network traffic. In some embodiments, management plane 210 communications may be encrypted.

In some embodiments, data plane communications may include communication between the agent controller 214A-214B and the agent node 206A-206B. An agent controller 214A may be configured to manage one or more agent nodes 206A within data plane zone 220A. The agent controller 214A may be configured to provide configuration management to agent node 206A and transmit image distribution and log aggregation information from the agent node 206 to the management plane 210 via zone proxy 212A. It is understood that data plane zone 220A may include two or more agent nodes each associated with a separate endpoint in other embodiments. In such embodiments, the agent controller 214A may be configured to manage the two or more agent nodes in data plane zone 220A.

FIG. 3A depicts a conventional single point security system 300A. The single point security system 300A may detect an infection 305 in the network via network node 302C. As shown in FIG. 3A, this may leave other points, e.g., end points 304A-304B, within the network vulnerable to the infection 305 while the single point security network 300A detects and attempts to mitigate the infection at network node 302C. Accordingly, in such single point security systems 300A, an administrator must apply both detection and mitigation across an entire network that requires coverage, e.g., network nodes 302A-302C. For example, the administrator must manually detect and stop horizontal and/or lateral movement of the infection. As another example, the administrator must manually detect and stop multiple systems from being leveraged for command and control (C2) or exfiltration malware.

FIG. 3B depicts an exemplary security system 300B, according to some embodiments. The security system 300B provides dynamic zone protection, as disclosed herein, which enables detection at any single point, e.g., network nodes 312A-312C, within a network. As shown in FIG. 3B, security system 300B may provide zone detection via network nodes 312A-312C to simultaneously detect the infection 305. In some embodiments, the zone detection may be applied across the security system 300B based on a predetermined policy. In some embodiments, the predetermined policy may include zone-specific actions, thereby protecting each of the endpoints 314A-314C included in the network.

FIG. 4 depicts a network node 400, according to some embodiments. The network node 400 may include a packet processing engine 410 and a processing analysis engine 420, according to some embodiments. While only one processing analysis engine 420 is depicted in FIG. 4, it is understood that the network node 400 may include two or more processing analysis engines in other embodiments.

In some embodiments, the packet processing engine 410 may be deployed inline to a network. The packet processing engine 410 may receive ingress data packets, e.g., IPv4 and/or IPv6 data packets. In some embodiments, the packet processing engine 410 may include a traffic merge component 412 in which the received data packets may be temporarily stored. The packet processing engine 410 may forward each received data packet to the processing analysis engine 420. The packet processing engine 410 may include a traffic replica component 414 configured to generate a replica of each temporarily stored data packet. In some embodiments, the traffic replica component 414 may be configured to generate a pointer for each temporarily stored data packet. In such embodiments, the traffic replica component 414 may share the generated pointers with the processing analysis engine 420, thereby enabling the processing analysis engine 420 to use the generated pointers to access the stored data packets. In some embodiments, the traffic replica component 414 may generate a copy of each temporarily stored data packet. In such embodiments, the traffic replica component 414 may transmit the generated copies to the processing analysis engine 420.

The packet processing engine 410 may further include a traffic basic filter component 415 configured to check if one or more attributes associated with the temporarily stored data packets match predetermined attributes. For example, the predetermined attributes may include a source, destination IP, port, protocol, etc. In some embodiments, the predetermined attributes may be associated with data packets, sessions, and/or data flow that may be malicious, e.g., C2 and/or exfiltration malware. If attributes associated with one or more data packets do not match predetermined attributes, the one or more data packets may be forwarded to the intended destination via a switching component 418.

If attributes associated with the temporarily stored one or more data packets matches the predetermined attributes, an Packet Processing Unit (PPU) engine component 416 may be configured to perform a dynamic action on the one or more data packets, a session associated with the one or more data packets, and/or a data flow associated with the one or more data packets. In some embodiments, the PPU engine component 416 may comprise a micro-program that includes an activation rule and micro-compiled code that is executed if the activation rule matches. In some embodiments, the micro-compiled code may be executed to respond to, copy, drop, route, and/or modify the one or more data packets. In some embodiments, the PPU engine component 416 may further include state and memory useful for subsequent re-execution of the micro-program. The micro-program may further include executing a program, one or more data packets, a session, and/or a data flow based on the one or more data packets. The micro-program may comprise of both states and instructions. In some embodiments, the one or more data packets may be transparently routed to a deception server. In the context of the current disclosure, a deception server may be referred to a server that acts like a legitimate server for the purpose of gathering information about a malicious actor and/or entity (also referred to collectively as "adversary") including what the adversary is trying to exploit and where the adversary is trying to gather information from. For example, the deception server may be utilized to detect SQL injection attempts. In some embodiments, the one or more data packets may reflect un-allowed traffic to bad domains. In such embodiments, the one or more data packets may be detected and redirected without detection by an adversary. In some embodiments, the one or more data packets may reflect encrypted malware. In such embodiments, the threat may be mitigated by dropping the one or more data packets.

The packet processing engine 410 may communicate such performed dynamic actions to the controller 408 and/or one or more network nodes 430A-430C. In such embodiments, the controller 408 and/or the one or more network nodes 430A-430C may dynamically detect and mitigate similar data packets based on the communication.

The processing analysis engine 420 may include a traffic replica receiver 422 configured to receive replicas of the temporarily stored data packets for a deep analysis of the data packets, as will be described in further detail below. The data packet replicas may be utilized by the detection module 424, which may include an event detection module 428 and one or more event handler modules 426A-426C. The detection module 428 may be configured for a deep analysis of sessions, file extractions, intelligence correlation, and many other similar higher-level data signals analysis performed across multiple packet contexts including network and endpoint information. For example, the event detection module 428 may be configured to detect predetermined protocols and/or malware. In the context of the current disclosure, intelligence correlation may refer to identifying attributes associated with detected IPs, domains, C2s, and behaviors and utilizing such identified attributes to detect similar associated threats in other environments. Each detected protocol and/or malware may be referred to as an event, and the event handler modules 426A-426C may be configured to perform an analysis of an event. In some embodiments, an event handler module 426A may obtain information from an agent node 406 regarding an associated endpoint. The agent node 406 may provide visibility to a process, user information associated with executing the process, network and/or file state on the endpoint, and/or ownership of files such that the information gained by that visibility may be used by the event handler module 426A for detection and coordination with the packet processing engine 410. For example, the event handler module 426A may query for information, run scans for malware on demand, and/or collect process images. Each of the event handler modules 426A-426C may be configured to detect predetermined protocols and/or obtain PPUs based on mitigation and detection macro-logic. For example, the event handler modules 426A-426C may obtain and/or generate micro-programs that include an activation rule and micro-compiled code that may be executed if the activation rule matches. The event handler modules 426A-426C may deploy such micro-programs to the packet processing engine 410 (e.g., traffic basic filter component 415, PPU engine component 416, and/or switching component 418).

In some embodiments, the controller 408 may receive messages from the packet processing engine 410, the agent node 406, and the processing analysis engine 420 such that those messages may be processed, organized and redistributed to other connected components, such as other network nodes 430A-430C, based on predetermined policies. For example, the controller 408 may perform a security analysis of the network including the network node 400, log the analysis, and/or perform and protocol or malware analysis based on the received messages. In some embodiments, the received messages may include endpoint process data obtained from the agent node 406, network metadata, associated PPUs, etc.

Figure 5:
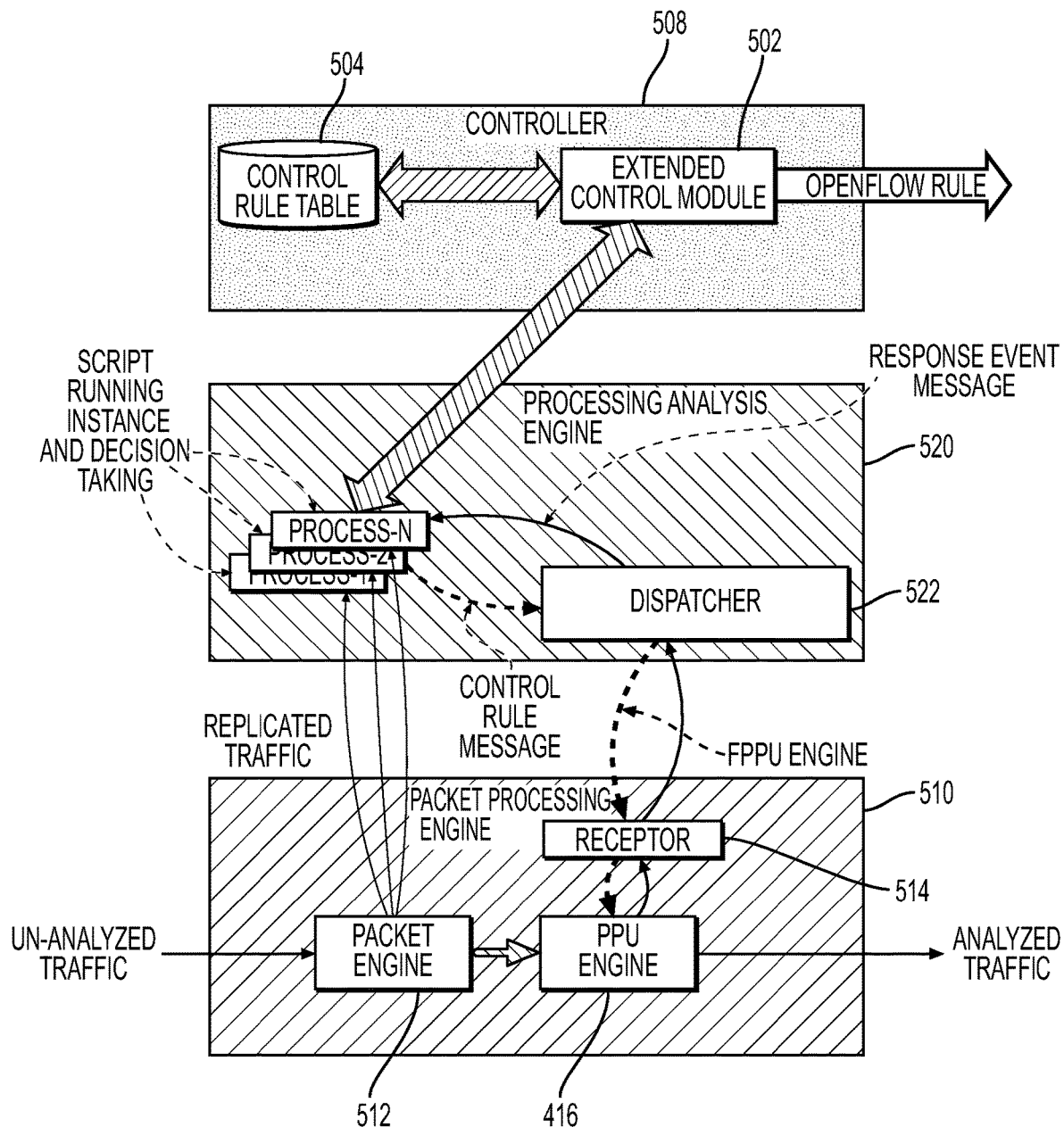
FIG. 5 depicts an exemplary controller, deep-path engine, and fast-path engine according to embodiments of the present disclosure.

FIG. 5 depicts a scaling processing according to some embodiments. In some embodiments, the packet processing engine 510 may be low latency and include a packet engine 512 configured to receive incoming un-analyzed traffic, e.g., incoming data packets, and share a replica of the incoming traffic with the processing analysis engine 520. In some embodiments, the packet engine 512 may include the traffic merge component 412, the traffic replica component 414, and the traffic basic filter components 415, as described above with reference to FIG. 4. The packet processing engine 510 may determine whether one or more attributes associated with the incoming traffic matches predetermined attributes. One or more deployed PPU engines 416 may be applied to incoming traffic as a result of determining that there is a match.

As shown in FIG. 5, the processing analysis engine 520 may be configured to perform a deep analysis of the incoming traffic based on the received replicated traffic. While only one processing analysis engine 520 is depicted in FIG. 5, it is understood that there may be more than two processing analysis engines in other embodiments. Additionally, the plurality of processing analysis engines may be located in one or more network nodes. That is, the deep analysis may be conducted on a distributed control plane. Referring back to processing analysis engine 520, the replicated traffic may include a replica of the one or more incoming data packets, a session associated with the incoming data packets, and/or a data flow associated with the incoming data packets. The processing analysis engine 520 may include scripts running one or more instances and making decisions with respect to each of the obtained replicas as processes 1, 2, . . . , N. The processes 1-N, i.e., the decision making process, may be based on one or more rules received from the controller 508. In some embodiments, the controller 508 may include a data store including a control rule table 504. The control rule table 504 may include various rules and/or actions to be applied in certain situations, for example, based on the detection of certain attributes associated with data packets and/or behaviors associated with malicious activities represented in the data packets. An extended control module 502 may relay such rules and/or actions to the processing analysis engine 520 to take into consideration for the decision making processes. In some embodiments, one or more actions may be determined for the processes 1-N, which may be relayed to a dispatcher 522. The dispatcher 522 may determine and/or obtain one or more PPU engines (i.e., micro-programs) for the determined actions. The one or more PPU engines may be deployed to the packet processing engine 510 via a receptor 514 such that the packet processing engine 510 may apply the deployed one or more PPU engines to currently incoming or future data packets, sessions, and/or data flows.

Figure 6:
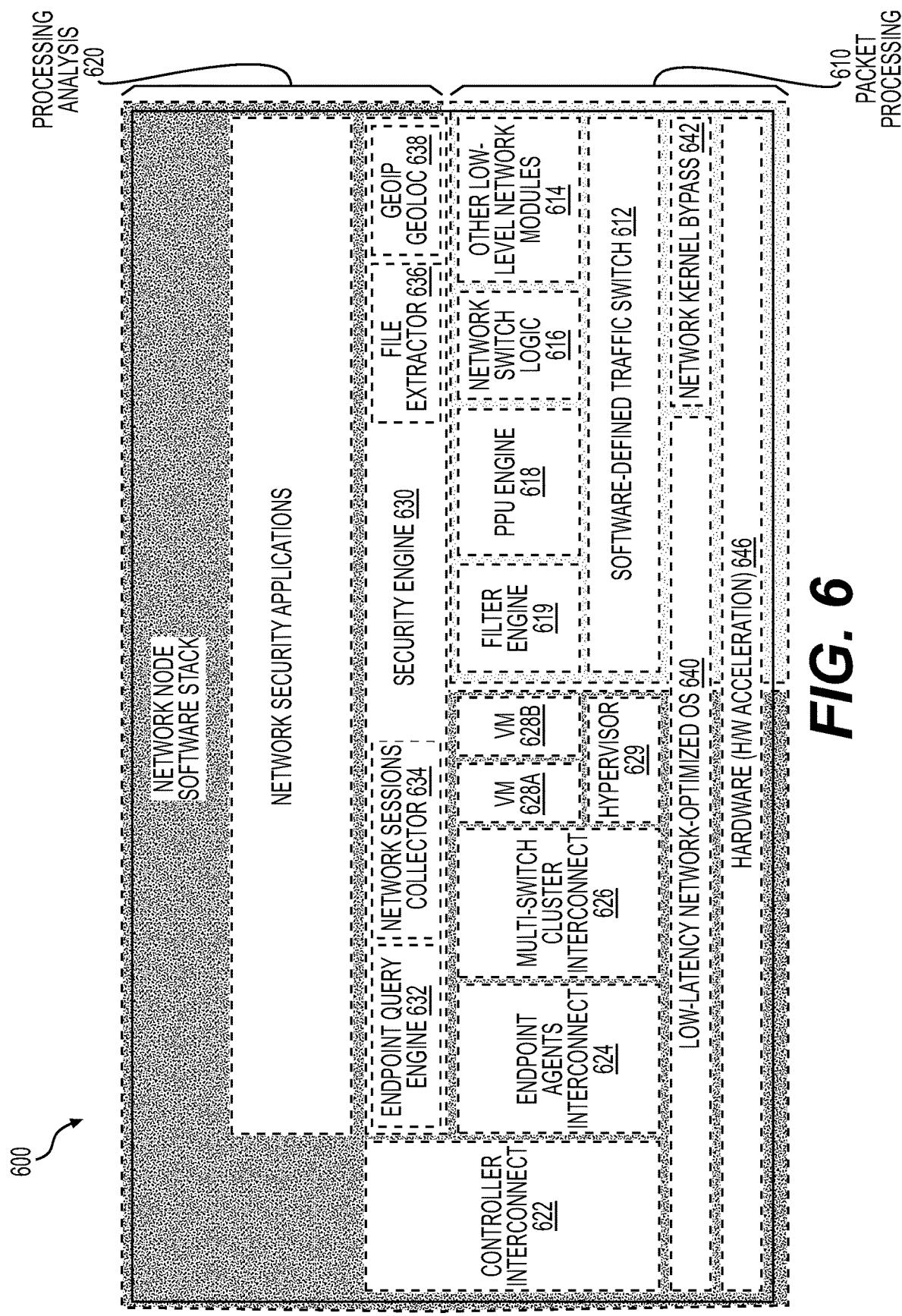
FIG. 6 depicts an exemplary network node architecture according to embodiments of the present disclosure.

FIG. 6 depicts an exemplary embodiment of a network node architecture 600 according to some embodiments. The modules, interfaces, and/or engines depicted in FIG. 6 may be implemented utilizing C, C++, hardware components, firmware, and/or compiled scripting languages, and any appropriate coding language. Accordingly, the network node architecture 600 as depicted in FIG. 6 may support both virtual and physical deployments. Network node 600 may include a low-latency network-optimized operating system 640 and hardware 646 for processing analysis 620 components and packet processing 610 components, as shown in FIG. 6. It is understood that the number of each component for processing analysis 620 and packet processing 610 shown in FIG. 6 may vary and the components may be rearranged in varying combinations in some embodiments.

Processing analysis 620 components may include network security applications 601, controller interconnect 622, endpoint agents interconnect 624, multi-switch cluster interconnect 626, hypervisor 629, one or more virtual machines 628A-628B, and security engine 630, according to some embodiments. Network security applications 601 may include one or more application may run on the network node 600 to analyze, detect, and/or mitigate threats, as described herein. Controller interconnect 622 may be configured to provide a connection between the network node 600 controller, e.g., security engine 630, and the rest of the system such as system 100 and 200 described above with reference to FIGS. 1 and 2. Endpoint agents interconnect 624 may be an agent controller as described above with reference to FIG. 2. As shown in FIG. 6, the endpoint agents interconnect 624 may be embedded on the network node 600 in some embodiments. In other embodiments, the endpoint agents interconnect 624 may be provided as a component separate from the network node 600, for example, as shown in FIG. 2. Multi-switch cluster interconnect 626 may be configured to logically interconnect multiple network nodes such that the network nodes may communicate and exchange data. For example, the exchanged data may be directed to information about detected malicious hosts or network sessions or about specific traffic routes such as updated network routing tables on each network node in order to deliver traffic correctly. Hypervisor 629 (also referred to as virtual machine monitor) may be computer software, firmware and/or hardware that creates and runs virtual machines 628A-628B. Security engine 630 may be referred to as a core service for security supporting the network security applications 601. For example, security engine 630 may include an endpoint query engine 632 configured to collect information from various endpoints, for example, using the endpoint agents interconnect 624. In some embodiments, the endpoint query engine 632 may be an interface configured to allow security applications to query various endpoints via agent nodes, as described herein. Security engine 630 may include a network sessions collector 634 configured to collect network sessions directed to and from the network node 600. Security engine 630 may include a file extractor 636 configured to extract files shared over the network. Security engine 630 may also include a geoIP and geolocation 638 interface configured to determine a geographic location of an IP address.

Packet processing 610 components may include a filter engine 619 and PPU engine 618 as described above with reference to FIGS. 4-5. Packet processing 610 components may include a software defined traffic switch 612, network switch logic 616, network kernel bypass 642, and other low-level network modules 614, e.g., network traffic switching modules or network traffic routing modules. Network traffic switching modules may be configured to switch packets across multiple physical ports based on MAC address or IP. Network traffic routing modules may be configured to send packets to specific hosts based on IP. Software defined traffic switch 612 may be configured to provide software controlled network switching to allow directing traffic within a network node, e.g., the network node 600, between the various components and/or supporting multiple ports for a single network node, e.g., network node 600. Network switch logic 616 may be logic applied for routing of internal forwarding, e.g., data packet forwarding. Network kernel bypass 612 may allow routing of packets without delay and interference from the kernel.

Figure 7B:
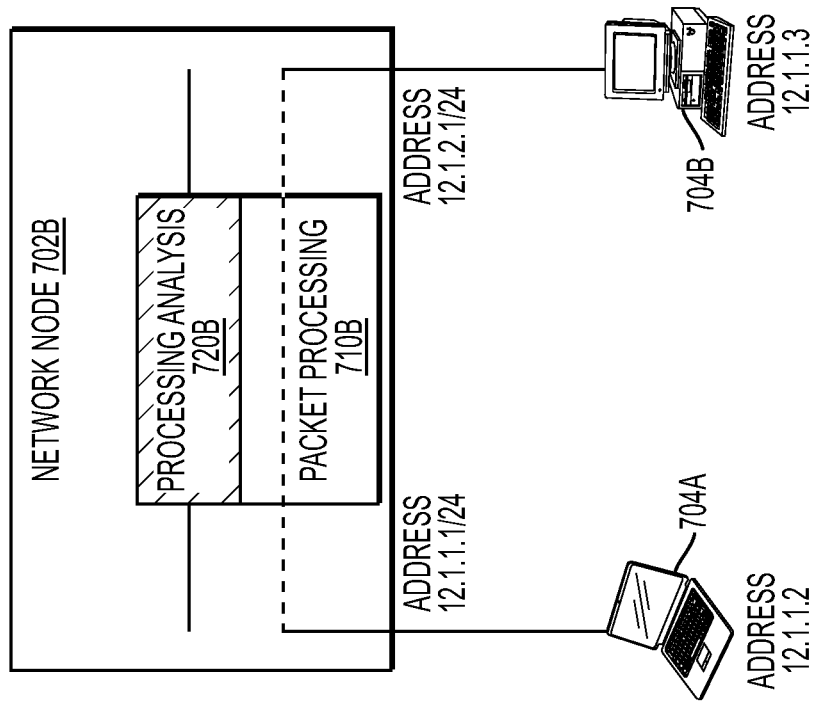
FIGS. 7A-7B depict network nodes comprising deep-path and fast-path engines in various modes according to embodiments of the present disclosure.
Figure 7A:
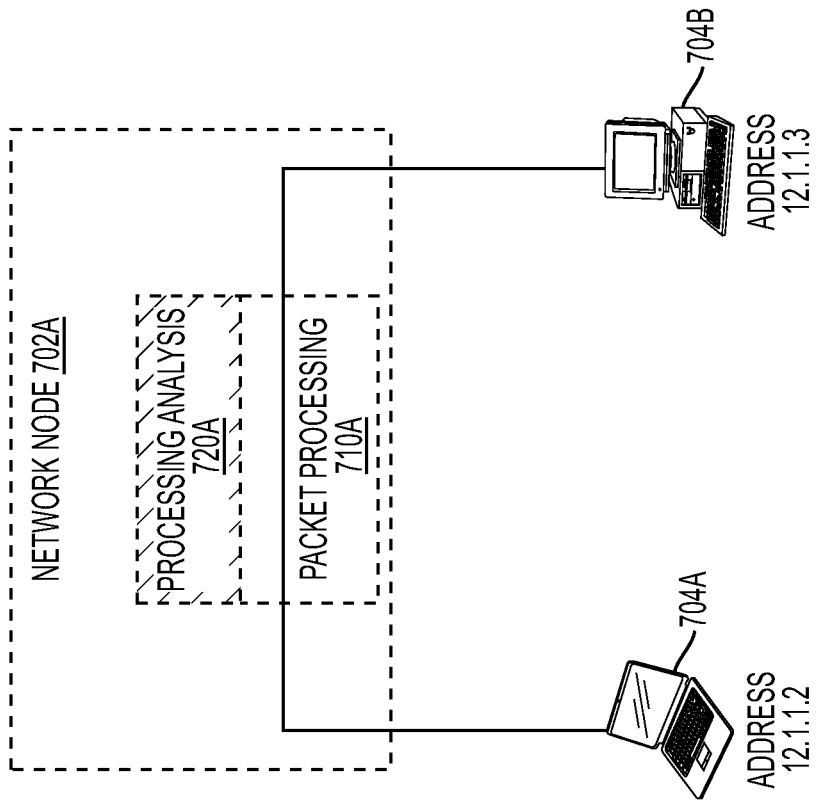

FIGS. 7A-7B depict network nodes in various modes according to some embodiments. FIG. 7A depicts a network node in a transparent mode (also referred to as an address mode). In the context of the current disclosure, address mode may refer to a network node 702A, in which IP network is visible, and provides distinct network interfaces. In the address mode, data-plane MAC or IP address may be utilized.

FIG. 7B depicts a network node 702B deployed in a transparent mode (also referred to as a link-only mode). In the context of the current disclosure, link-only mode may refer to a network node 702 in which a MAC or IP network is not discoverable while providing detection and mitigation. In the link-only mode, data-plane MAC or IP address is not required, and the network node 702B may provide a reduced attack surface for malicious activities.

Figure 8:
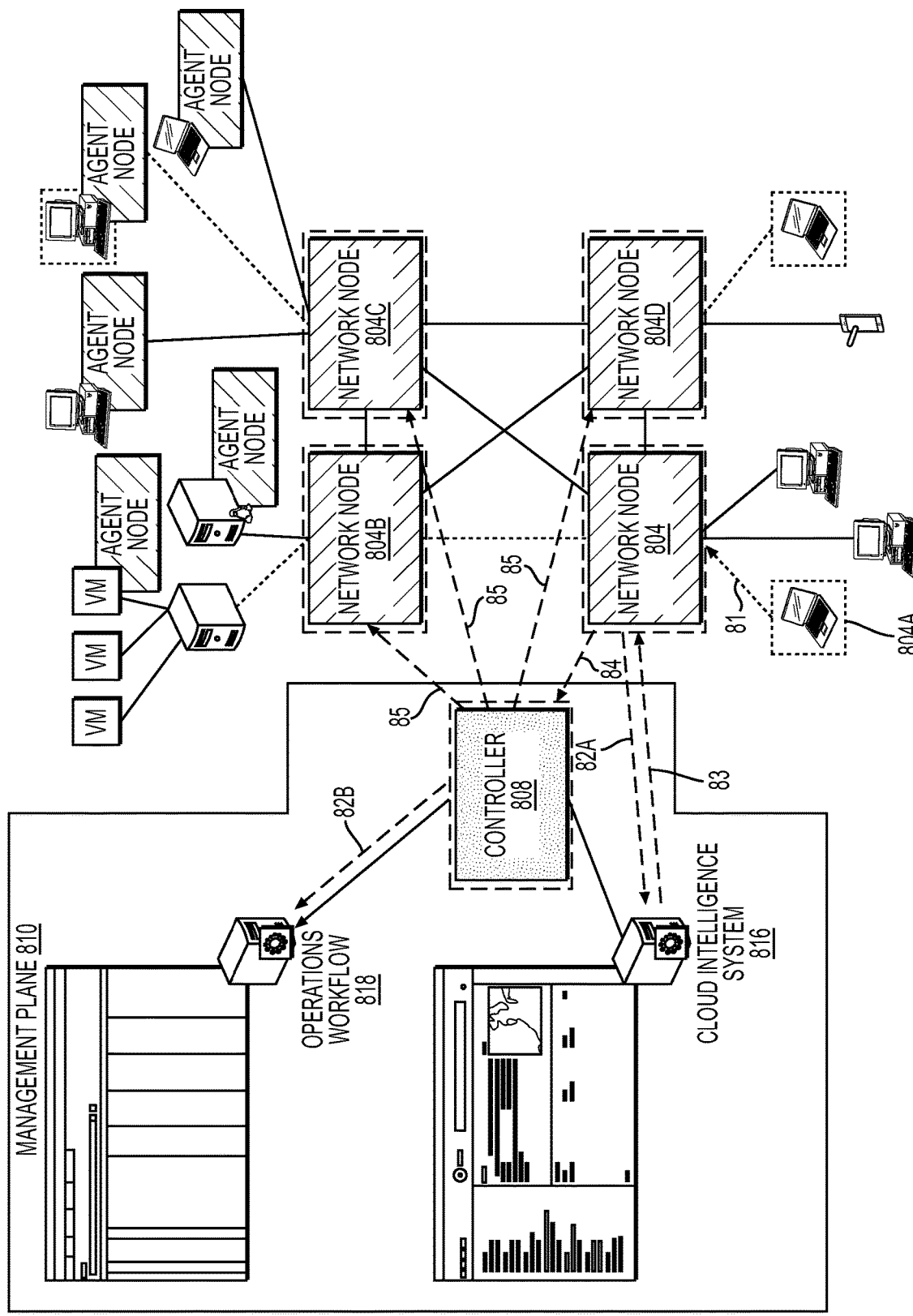
FIG. 8 depicts an exemplary application of dynamic zone protection according to embodiments of the present disclosure.

FIG. 8 depicts an exemplary application of dynamic zone protection according to some embodiments disclosed herein. In step 81, an endpoint 804 may request access to a domain, e.g., Domain A. In response to the request, network node 804A may extract information from the request access and investigate Domain A by communicating with components included in management plane 810. For example, the network node 804A may transmit an alert to an operations workflow management system 818 via the controller 808 (step 82A) about the event (e.g., the request access to Domain A) and request information from a cloud intelligence system 816 (step 82B) regarding the domain. In step 83, the cloud intelligence system 816 may respond with a determined score assigned to Domain A and indicate that the domain is a known C2. The network node 804A may apply mitigation actions to block C2 from Domain A. Once the mitigation actions have been applied, the network node 804A may transmit a report to the controller 808 (step 84) reporting the applied mitigation actions and the relevant Domain A information, e.g., the determined score and the indication that the domain is a known C2. The controller 808, in turn, may then replicate the report and notify the other network nodes 804B-804D in step 85. Accordingly, future C2 attempts associated with Domain A may be mitigated at all of the network nodes 804A-804D (i.e., the distributed control plane) without having to query the management plane 810.

Figure 9:
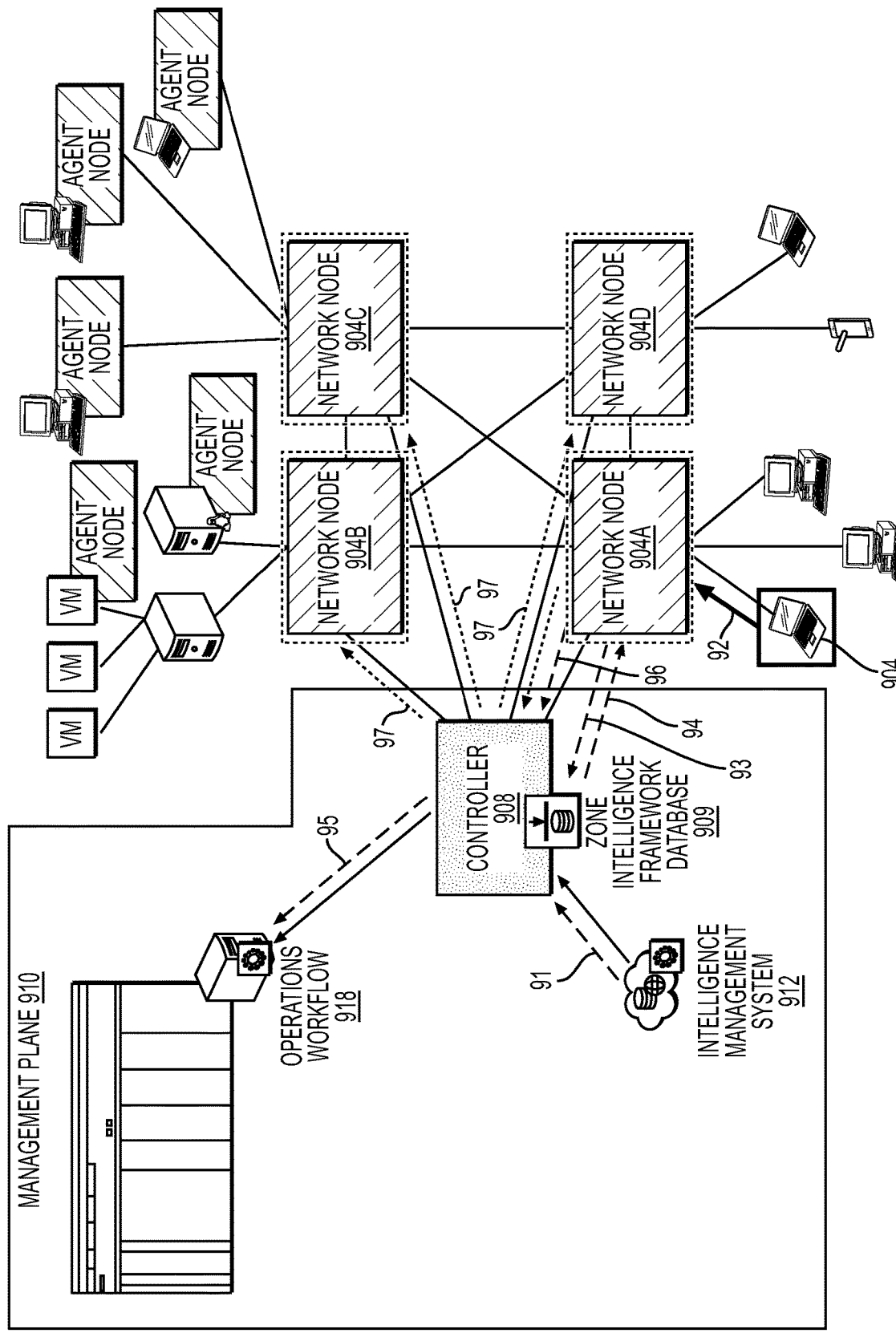
FIG. 9 depicts another exemplary application of dynamic zone protection according to some embodiments.

FIG. 9 depicts an exemplary application of dynamic zone protection according to some embodiments disclosed herein. In step 91, an intelligence management system 912 may transmit periodic reports to a controller 908, which may include information regarding a variety of malicious activities. In some embodiments, the information may be stored in a zone intelligence framework database 909. In step 92, an endpoint 904 may request access to a domain, e.g., Domain A. In response to the request, network node 904A may extract information from the request access and investigate Domain A by communicating with components included in management plane 910. For example, the network node 904A may request information from the controller 908 (step 93) regarding the domain. In step 94, the zone intelligence framework database 909 respond with an indication that domain A is a known C2. In step 95, an operations workflow management system 918 may be alerted about the event (e.g., the request access to Domain A). The network node 904A may apply mitigation actions to block C2 from Domain A. Once the mitigation actions have been applied, the network node 904A may transmit a report to the controller 908 (step 96) reporting the applied mitigation actions and the relevant Domain A information, e.g., the indication that the domain is a known C2. The controller 908, in turn, may then replicate the report and notify the other network nodes 904B-904D in step 97. Accordingly, future C2 attempts associated with Domain A may be mitigated at all of the network nodes 904A-904D (i.e., the distributed control plane) without having to query the management plane 910.

Figure 10:
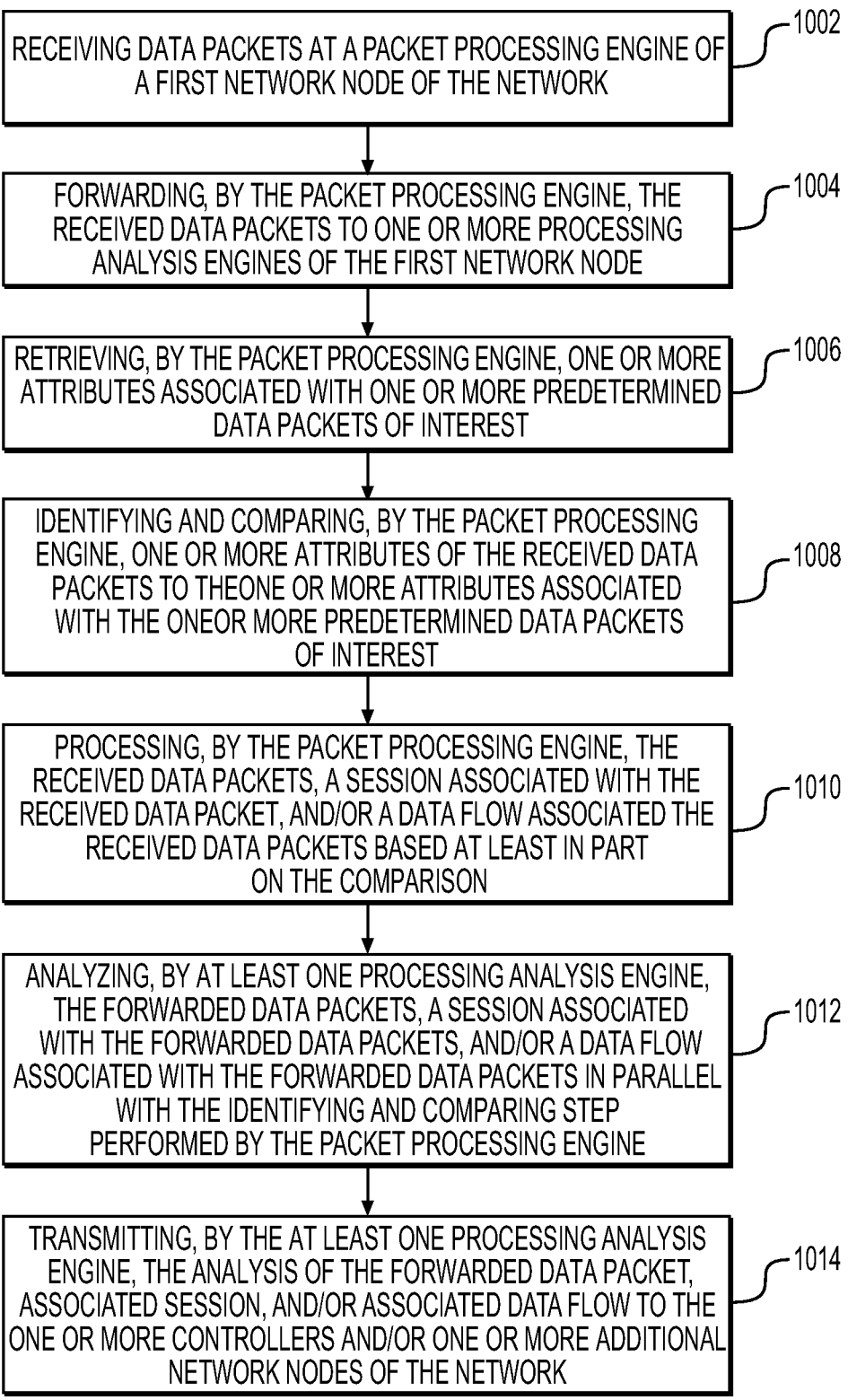
FIG. 10 depicts an exemplary method of securing a network using one or more controllers and one or more network nodes, according to exemplary embodiments of the present disclosure.

FIG. 10 depicts an exemplary method 1000 of securing a network using one or more controllers and one or more network nodes according to some embodiments. The method 1000 may begin with step 1002 in which a packet processing engine of a first network node of the network may receive data packets. In step 1004, the packet processing engine may forward the received data packets to one or more processing analysis engines of the first network node. In step 1006, the packet processing engine may retrieve one or more attributes associated with one or more predetermined data packets of interest. In step 1008, the packet processing engine may identify and compare one or more attributes of the received data packets to the one or more attributes associated with the one or more predetermined data packets of interest. In step 1010, the packet processing engine may process the received data packets, a session associated with the received data packets, and/or a data flow associated with the received data packets based at least in part on the comparison. In some embodiments, processing the received data packets, the associated session, and/or the associated data flow may include the packet processing engine responding to, copying, dropping, routing, and/or modifying the received data packets, the associated session, and/or the associated data flow based on the comparison. In some embodiments, processing the received data packets, the associated session, and/or the associated data flow may include the packet processing engine executing a program based on the comparison. In some embodiments, processing the received data packets, the associated session, and/or the associated data flow may include the packet processing engine creating a data packet, a session, and/or a data flow based on the comparison.

In step 1012, the at least one processing analysis engine may analyze the forwarded data packets, a session associated with the forwarded data packets, and/or a data flow associated with the forwarded data packets in parallel with the identifying and comparing step performed by the packet processing engine in step 1008. In step 1014, the at least one processing analysis engine may transmit the analysis of the forwarded data packets, the associated session, and/or the associated data flow to the one or more controllers and/or one or more additional network nodes of the network. In some embodiments, the one or more controllers may be configured to control the first network node to (i) update the one or more predetermined data packets of interests based on the received analysis and (ii) transmit one or more attributes associated with the updated one or more predetermined data packets of interest to the one or more additional network nodes and/or one or more agent nodes.

In some embodiments, the one or more processing analysis engines may include a first processing analysis engine of the first network node of the network and a second processing analysis engine of a second network node of the network.

In some embodiments, the one or more processing analysis engines may receive one or more messages transmitted by an agent node connected to the first network node of the network. In some embodiments, the one or more messages may describe information captured on a network connected device, one or more networks associated with the network connected device, a file state associated with the network connected device, and/or user information associated with the network connected device. In some embodiments, the one or more processing analysis engines may transmit the analysis and the one or more messages to one or more controllers. In such embodiments, the one or more controllers may be configured to: (i) update the one or more predetermined data packets of interests based on the received analysis and the one or more messages, and (ii) transmit the one or more attributes associated with the updated one or more predetermined data packets of interest to the one or more additional network nodes.

In some embodiments, the one or more attributes associated with the one or more predetermined data packets of interest may be stored in a data store of the network node and/or the one or more controllers. The network node and/or the one or more controller may be configured to update the stored one or more attributes associated with the one or more predetermined data packets of interest based on the one or more attributes associated with the updated one or more predetermined data packets of interest.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A method of securing a network using one or more controllers and one or more network nodes, the method comprising:
receiving data packets at a packet processing engine of a first network node of the network;
forwarding, by the packet processing engine, the received data packets to one or more processing analysis engines of the first network node;
retrieving, by the packet processing engine, one or more attributes associated with one or more predetermined data packets of interest;
identifying and comparing, by the packet processing engine, one or more attributes of the received data packets to the one or more attributes associated with the one or more predetermined data packets of interest;
processing, by the packet processing engine, the received data packets, a session associated with the received data packets, and/or a data flow associated with the received data packets based at least in part on the comparison;
analyzing, by at least one processing analysis engine, the forwarded data packets, a session associated with the forwarded data packets, and/or a data flow associated with the forwarded data packets in parallel with the identifying and comparing step performed by the packet processing engine; and
transmitting, by the at least one processing analysis engine, the analysis of the forwarded data packets, associated session, and/or associated data flow to the one or more controllers and/or one or more additional network nodes of the network;
wherein the one or more controllers are configured to control the first network node to (i) update the one or more predetermined data packets of interests based on the received analysis and (ii) transmit one or more attributes associated with the updated one or more predetermined data packets of interest to the one or more additional network nodes and/or one or more agent nodes.

2. The method of claim 1, wherein the one or more processing analysis engines include a first processing analysis engine of the first network node of the network and a second processing analysis engine of a second network node of the network.

3. The method of claim 1, wherein processing the received data packets, the session associated with the received data packets, and/or the data flow associated with the received data packets based on the comparison comprises:
responding to, copying, dropping, routing, and/or modifying, by the packet processing engine, the received data packets, the associated session, and/or the associated data flow based at least in part on the comparison;
executing a program, by the packet processing engine, based at least in part on the comparison; and/or
creating a data packet, a session, and/or a data flow, by the packet processing engine, based at least in part on the comparison.

4. The method of claim 1, further comprising:
receiving, by the at least one of the one or more processing analysis engines, one or more messages transmitted by an agent node connected to the first network node of the network.

5. The method of claim 4, wherein the one or more messages describe information captured on a network connected device, one or more networks associated with the network connected device, a file state associated with the network connected device, and/or user information associated with the network connected device.

6. The method of claim 4, further comprising:
transmitting, by the at least one processing analysis engine, the analysis and the one or more messages to the one or more controllers,
where in the one or more controllers are configured to (i) update the one or more predetermined data packets of interests based on the received analysis and the one or more messages, and (ii) transmit the one or more attributes associated with the updated one or more predetermined data packets of interest to the one or more additional network nodes.

7. The method of claim 1, wherein the one or more attributes associated with the one or more predetermined data packets of interest are stored in a data store of the network node and/or the one or more controllers, and
wherein the network node and/or the one or more controllers are configured to update the stored one or more attributes associated with the one or more predetermined data packets of interest based on the one or more attributes associated with the updated one or more predetermined data packets of interest.

8. A system for securing a network, the system comprising:
a first network node comprising a first packet processing engine and one or more processing analysis engines including a first processing analysis engine, wherein the first packet processing engine is configured to:
receive and forward data packets to the first processing analysis engine,
retrieve one or more attributes associated with one or more predetermined data packets of interest,
identify and compare one or more attributes of the received data packets to the one or more attributes associated with the one or more predetermined data packets of interest, and
process the received data packets, a session associated with the received data packets, and/or a data flow associated with the received data packets based at least in part on the comparison, and
wherein the first processing analysis engine is configured to:
analyze the forwarded data packets, a session associated with the forwarded data packets, and/or a data flow associated with the forwarded data packets in parallel with the identifying and comparing step performed by the first packet processing engine, and
transmit the analysis of the forwarded data packets, associated session, and/or associated data flow to one or more controllers and/or one or more additional network nodes of the network; and
one or more controllers configured to control at least the first network node to: (i) update the one or more predetermined data packets of interests based on the received analysis and (ii) transmit one or more attributes associated with the updated one or more predetermined data packets of interest to the one or more additional network nodes.

9. The system of claim 8, further comprising a second network node comprising a second packet processing engine and a second processing analysis engine, wherein the first packet processing engine is further configured to forward the received data packet to the first processing analysis engine and the second processing analysis engine, and
wherein the first and second processing analysis engines are configured to analyze the forwarded data packets, associated session, and/or associated data flow in parallel with the identifying and comparing step performed by the first packet processing engine.

10. The system of claim 8, wherein the first packet processing engine is configured to:
process the received data packets, associated session, and/or associated data flow by responding to, copying, dropping, routing, and/or modifying the received data packets, the associated session, and/or the associated data flow based at least in part on the comparison;
process the received data packets, associated session, and/or associated data flow by executing a program based at least in part on the comparison; and/or
process the received data packets, associated session, and/or associated data flow by creating a data packet, a session, and/or a data flow based at least in part on the comparison.

11. The system of claim 8, further comprising:
an agent node configured to transmit one or more messages to the first processing analysis engine and/or the one or more controllers, wherein the one or more messages describe information captured on a network connected device, one or more networks associated with the network connected device, a file state associated with the network connected device, and/or user information associated with the network connected device.

12. The system of claim 11, wherein the first processing analysis engine is configured to analyze the forwarded data packet at least based on the received one or more messages regarding the network connected device in parallel with the identifying and comparing step performed by the first packet processing engine.

13. The system of claim 11, wherein the first processing analysis engine is configured to transmit the analysis and the one or more messages to one or more controllers, and
wherein the one or more controllers are configured to (i) update the one or more predetermined data packets of interests based on the received analysis and the one or more messages and (ii) transmit the one or more attributes associated with the updated one or more predetermined data packets of interest to the one or more network nodes.

14. The system of claim 8, further comprising:
a data store configured to store the one or more attributes associated with the one or more predetermined data packets of interest,
wherein the one or more controllers and/or the first network node are configured to update the stored one or more attributes associated with the one or more predetermined data packets of interest based on the one or more attributes associated with the updated one or more predetermined data packets of interest.

15. The system of claim 8, wherein the first network node comprises the one or more controllers.

16. A system for a securing a network, the system comprising:
an agent node configured to transmit one or more messages regarding a network connected device to a first processing analysis engine of a first network node and/or one or more controllers, wherein the network connected device is connected to the first network node of the network;
the first network node comprising a first packet processing engine and one or more processing analysis engines including a first processing analysis engine, wherein the first packet processing engine is configured to:
receive and forward a plurality of data packets to the first processing analysis engine,
retrieve one or more attributes associated with one or more predetermined data packets of interest,
identify and compare one or more attributes of the received data packets to the one or more attributes associated with the one or more predetermined data packets of interest, and
process the received data packets, a session associated with the received data packets, and/or a data flow associated with the received data packets based at least in part on the comparison, and
wherein the first processing analysis engine is configured to:
analyze the forwarded data packet, a session associated with the forwarded data packets, and/or a data flow associated with the forwarded data packets at least based on the received one or more messages regarding the network connected device in parallel with the identifying and comparing step performed by the first packet processing engine, and
transmit the analysis and/or the one or more messages regarding the network connected device to the one or more controllers; and
the one or more controllers configured to control at least the first network node to: (i) update the one or more predetermined data packets of interests based on the received analysis and the one or more messages regarding the network connected device and (ii) transmit one or more attributes associated with the updated one or more predetermined data packets of interest to the one or more network nodes.

17. The system of claim 16, further comprising a second network node comprising a second packet processing engine and a second processing analysis engine, wherein the first packet processing engine is further configured to forward the received data packet to the first processing analysis engine and the second processing analysis engine, and
wherein the first and second processing analysis engines are configured to analyze the forwarded data packet, associated session, and/or associated data flow in parallel with the identifying and comparing step performed by the first packet processing engine.

18. The system of claim 16, wherein the first packet processing engine is configured to:
process the received data packets, associated session, and/or associated data flow by responding to, copying, dropping, routing, and/or modifying the received data packets, the associated session, and/or the associated data flow based at least in part on the comparison;
process the received data packets, associated session, and/or associated data flow by executing a program based at least in part on the comparison; and/or
process the received data packets, associated session, and/or associated data flow by creating a data packet, a session, and/or a data flow based at least in part on the comparison.

19. The system of claim 16, wherein the one or more messages describe information captured on the network connected device, one or more networks associated with the network connected device, a file state associated with the network connected device, and/or user information associated with the network connected device.

20. The system of claim 16, further comprising:
a data store configured to store the one or more attributes associated with the one or more predetermined data packets of interest,
wherein the one or more controllers and/or the first network node are configured to update the stored one or more attributes associated with the one or more predetermined data packets of interest based on the one or more attributes associated with the updated one or more predetermined data packets of interest.

* * * * *